United States Patent [19]

Bushman et al.

[11] 4,114,031
[45] Sep. 12, 1978

[54] DATA CARD READER EMPLOYING SYNCHRONIZATION AND RESYNCHRONIZATION MEANS

[75] Inventors: Willard T. Bushman, Palm Bay; Robert C. Snyder, Melbourne, both of Fla.

[73] Assignee: Documation Incorporated, Palm Bay, Fla.

[21] Appl. No.: 608,897

[22] Filed: Aug. 29, 1975

[51] Int. Cl.$^2$ ............... G06K 7/016; H04L 15/34; G06K 7/04
[52] U.S. Cl. ............... 235/474; 235/466; 179/15 BS
[58] Field of Search ............... 235/61.11 R, 61.11 D, 235/61.11 E, 61.11 A, 61.7 B, 61.9 R, 61.7 R, 92 R; 318/606, 608, 611, 615, 617, 607; 340/149 A; 178/30; 250/569; 179/15 BS

[56] References Cited

U.S. PATENT DOCUMENTS

| | | | |
|---|---|---|---|
| 3,184,581 | 5/1965 | Willoughby | 179/15 BS |
| 3,229,073 | 1/1966 | Macker | 235/61.11 E |
| 3,419,710 | 12/1968 | Matthews | 235/61.11 E |
| 3,420,989 | 1/1969 | Sapp | 235/92 R |
| 3,474,230 | 10/1969 | McMillen | 235/61.7 R |
| 3,523,231 | 8/1970 | Arthur | 318/608 |
| 3,663,800 | 5/1972 | Myer | 235/61.11 E |
| 3,751,639 | 8/1973 | Searle | 235/61.11 E |
| 3,828,168 | 8/1974 | O'Callaghan | 318/615 |

*Primary Examiner*—Robert M. Kilgore
*Attorney, Agent, or Firm*—Duckworth, Hobby, Allen & Pettis

[57] ABSTRACT

A card reader for reading data cards of the type having columns of machine-readable information thereon and transmitting data outputs representative of this information to an interface, includes a read station for sensing the information in each column and generating corresponding data outputs. A latching circuit receives data outputs from the sensing means and transmits the data outputs to the interface responsive to a strobing signal. A timing wheel is employed to detect the velocity of the cards during transport through the read station to provide an output proportional to velocity. A train of pulses is generated for each column responsive to the velocity output, and the period of the pulse train is adjusted to compensate for increases or decreases in the velocity of the card through the read station, by employing a phase-locked loop circuit. The pulse train is then decoded to generate the strobing signal to the latching means coincident with a first predetermined pulse in the train, and for utilizing other pulses in the train to generate signals initiating other functions of the reader.

23 Claims, 4 Drawing Figures

DATA CARD READER EMPLOYING SYNCHRONIZATION AND RESYNCHRONIZATION MEANS

BACKGROUND OF THE INVENTION

1. Field of the Invention

The present invention relates to apparatus designed to decode information contained on data cards, such as punched cards, for example. In particular, the present invention is directed to new and useful means and methods for synchronizing electronic data outputs representative of the information with the corresponding area of the data card where such information is located; and to new and useful means and methods of resynchronizing the electronic data outputs when an area of information on a data card is not detected at an anticipated time or location.

2. Description of the Prior Art

Card readers are employed to "read" coded information on data cards. Generally, the information is arranged on a card in rows and columns, and takes the form of a punched hole, a magnetic stripe, or the like.

It is essential that a card reader be capable of correlating specific data outputs with the corresponding column of information being read. If this correlation is not maintained, then a given output is incorrectly attributed to the wrong column; alternatively, when the information is not located at the appropriate area of the card, as a misregistered column, for example, an incorrect data output will result. These problems can arise from changes in the velocity of the data card through the reader caused by variations in drive motor voltage or temperature; or by misregistry of the punched holes or magnetic stripes.

Some of the above-described problems have been solved in prior art card readers by employing relatively expensive hysterisis-type synchronous motors. Other arrangements have utilized large timing discs having a plurality of striations per column, and have coordinated the data outputs with specific mechanical striations.

Phase comparison and referencing techniques are utilized in a number of applications in the electronic arts. Examples of patents disclosing such arrangements are U.S. Pat. Nos.: 3,238,459 to Landee; 3,150,352 to Einsel et al.; 3,010,028 to Mierhoff et al.; 3,201,759 to Kelley; 3,523,231 to Arthur et al.; 3,851,238 to Fletcher et al.; 3,420,989 to Sapp; 3,683,345 to Faulkes et al.; 3,336,534 to Gluth; 2,992,411 to Abbott; 3,181,122 to Brown; and 3,839,665 to Gabor.

SUMMARY OF THE INVENTION

The present invention contemplates apparatus for reading data cards of the type having columns of machine-readable information thereon, and for providing data outputs representative of said information to a device interfaced therewith, in which the apparatus includes means for synchronizing the data outputs with respective columns of the cards. The synchronizing means includes a rotatable shaft for driving the cards through the apparatus, and means for detecting the position of the shaft for each column. Means are also included for receiving an output from the detecting means and generating a train of pulses, the period of the pulse train being dependent upon the angular velocity of the shaft. Means are further provided for processing the pulse train for correlation of each data input with a corresponding one of the columns.

In particular, the processing means comprises means for decoding and counting the pulses in the pulse train and generating a strobing signal to latching means holding the data outputs from the card reader, until the strobing signal is applied thereto. The decoding and counting means also utilizes various pulses in the train to generate signals initiating other card reader functions, including an index mark signal to the interface device indicating that data has been transmitted to the interface.

The system of the present invention also contemplates detection of the misregistry of an information column, and re-initiation of the pulse train generating means when such misregistry is detected, in order to resynchronize the data outputs representative of such misregistered column.

THE DRAWINGS

FIGS. 1 and 2 together form an overall block diagram of the system in accordance with the present invention.

FIGS. 3(a)-(j), inclusive, are wave forms illustrating various electronic and electromagnetic signals related to the operation of the system shown in FIGS. 1 and 2.

FIG. 4 is a top plan view of a punched data card of the type read by the system of FIGS. 1 and 2.

DETAILED DESCRIPTION

Figure 1:
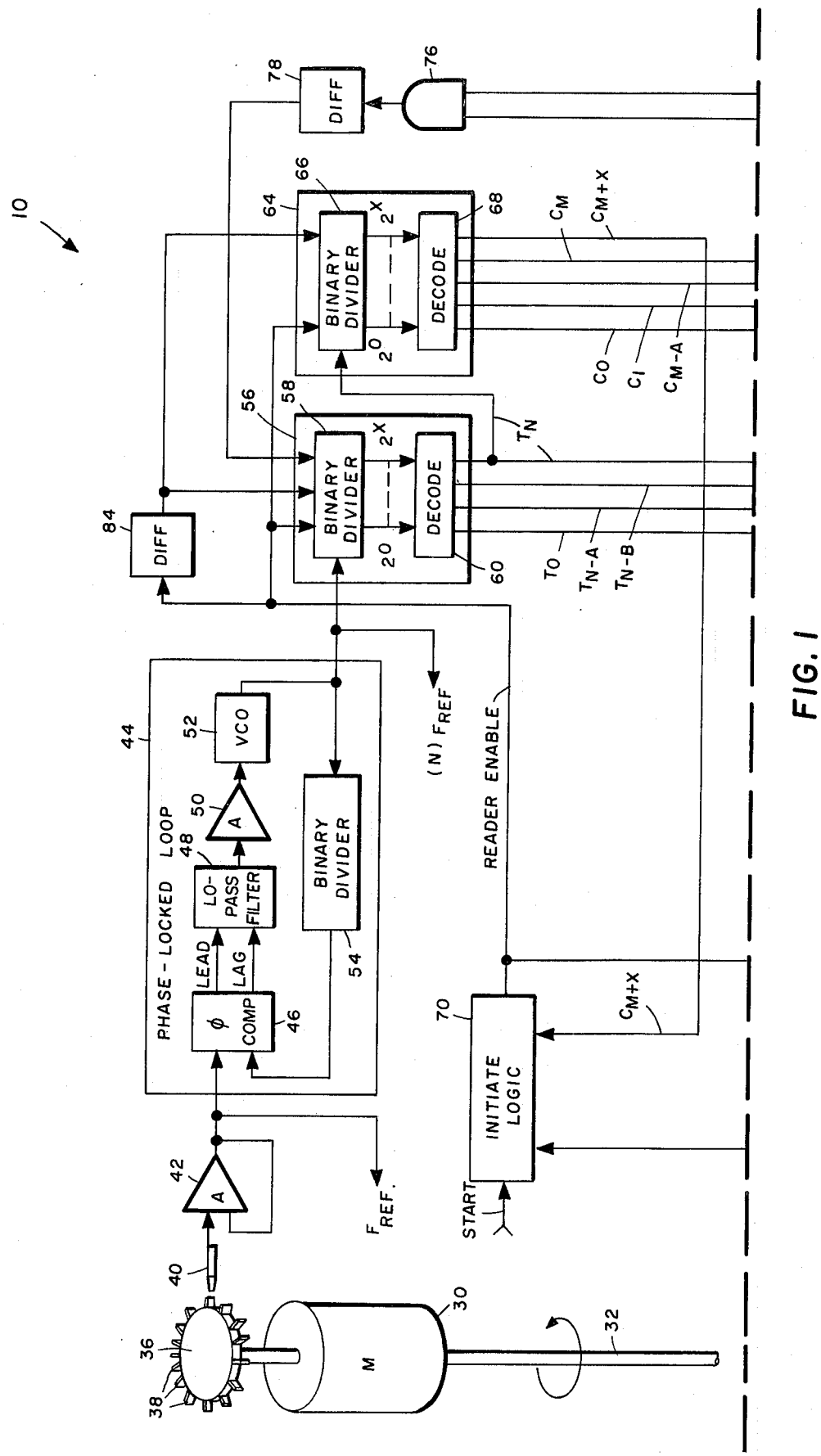

An initial description of a card reader system employing synchronization and resynchronization means in accordance with the present invention will be described with reference to FIGS. 1 and 2, followed by a description of the operation of the system referenced to FIGS. 1-4, inclusive.

I. SYSTEM LAYOUT

A. Data Output

The system, referred to generally as 10, includes a read station 12 having a slot 14 for receiving a data card 11 in the read station. The data card 11 has a leading edge 13 and a trailing edge 15, and a plurality of bits of information disposed in columns thereon, such as punched holes 17. It will be understood by those skilled in the art that the read station 12 includes a plurality of light sources and photocells therein, which are adapted to provide an output when one of the punched holes 17 are detected between the light source and the photocell.

The system 10 also includes an output section 16 for receiving the photocell outputs 18 from the read station 12. The output section 16 includes photocell amplifiers 20 which amplifies the outputs from the read station 12 and forwards these signals to a gating circuit 22 and to a data latching circuit 24. The outputs of the data latching circuit 24 are fed through appropriate line drivers 26 to an interface device (not shown) of the type adapted to receive data from the reader 10.

The gating circuit 22 includes a plurality of "and" and "or" gates of conventional design, all of the photocell outputs being "anded" together to provide an "all dark" output in the event that no photocell in the read station 12 is energized, as for example in the no-data fields immediately following the leading edge 13 and immediately prior to the trailing edge 15 of the card 11. All of the photocell outputs are likewise all "ored" together to provide a "one-light" output in the event any one photocell in the read station 12 is energized.

The data latching circuit 24 is of a type used with state of the art card readers, and is adapted to hold the outputs from the photocells in the read station 12 and then transmit the photocell outputs to the line drivers 26 responsive to a strobing signal.

B. Card Transport Mechanism and Timing Disc

The card reader 10 further includes a motor 30 having a shaft 32 to which is attached a drive wheel 34 positioned adjacent the read station 12 and which is adapted to transport the data card 11 through the slot 14. While a direct mechanical connection between the shaft 32 and the wheel 34 is shown, it will be understood that complex belt and pulley arrangements or mechanical equivalents thereof are utilized in state of the art card readers, it being further understood that the simplified arrangement of FIGS. 1 and 2 is utilized for descriptive purposes only.

A timing disc 36 is fixed to the shaft 32. The disc 36 includes a plurality of ferrous notches 38. A magnetic transducer 40 is positioned adjacent the disc 36 to detect the notches 38 and provide a reference signal, $F_{ref}$, the frequency of which is directly proportional to the rotational speed of the shaft 32. A pulse squaring amplifier 42 refines the output from the transducer 40.

C. Synchronization Circuit

The output from the amplifier 42 is fed into a phase-locked loop circuit 44 which includes a phase comparator 46, a low pass filter 48, an amplifier 50, a voltage controlled oscillator (VCO) 52, and a binary divider 54. As shown in FIG. 1, the output from the amplifier 42 is fed into the phase comparator 46, which likewise receives an output from the binary divider 54. The phase comparator 46 provides either a lead or lag signal to the filter 48, which signal is amplified at 50 and forwarded to the VCO 52, the output of which is coupled to the binary divider 54. Phase-locked loop circuits of the type shown are adapted to provide, after a start up period, an output which is a pulse train having a binary number (N) of pulses for each cycle of the $F_{ref}$ signal. This (N) $F_{ref}$ signal is fed into a column counting circuit 56, which includes a binary divider circuit 58 and a decoder circuit 60. The column counting circuit 56 provides four output signals, $T_O$, $T_{N-A}$, $T_{N-B}$ and $T_N$, which are described in detail below with reference to the operation of the reader 10. These outputs are fed to an event gating circuit 62. One output, $T_N$, is also fed to a card counting circuit 64, which includes a binary divider circuit 66 and a decoder 68. The card counting circuit 68 generates five output signals, $C_O$, $C_I$, $C_{M-A}$, $C_M$ and $C_{M+X}$ which are also described below. The first four of these signals are transmitted to the event gating circuit 62, and the fifth signal, $C_{M+X}$, is transmitted to an initiation logic circuit 70.

The event gating circuit 62 includes a plurality of "and" gates, utilized to generate seven outputs, each of which represents an input of one signal from either counting circuit 58, 64; or the coincidence of two signals, one from each counting circuit (as shown by legends in FIG. 2), in order to initiate various card reader functions as described more fully below. Three of the outputs from the event gating circuit 62 are coupled to an error logic circuit 72, these outputs serving as a leading edge dark check (L. E. dark ck), a trailing edge dark check (T. E. dark ck) and a trailing edge light check (T. E. light ck). The error logic circuit 72 also receives the "all dark" and "one-light" outputs from the gating circuit 22 and the output section 16. Fourth and fifth outputs from the event gating circuit 62 comprise "wide data strobe" and "clear data" signals fed to the data latching circuit 24. A sixth output signal from the event gating circuit 62 is fed directly through a line driver 74 as an "index mark" to the interface, indicating the availability of data outputs from the line drivers 26 associated with the output section 16.

Referring again to the error logic circuit 72, this circuit includes an output to the interface through a line driver 80. Referring also to the initiation logic circuit 70, this circuit receives the "all dark" input signal from the gating circuit 16. The output of the initiation logic circuit 70 provides a "reader enable" signal which is differentiated at circuit 84 and fed into both the column and card counting circuits 56 and 64.

D. Resynchronization Circuit

A seventh and final output from the event gating circuit 62 is a "resynch enable" signal to an "and" gate 76, which also receives the "one-light" output from the gating circuit 22 and the output section 16. The output of the "and" gate 76 is differentiated at differential amplifier 78, and fed into the binary divider 58 of the column counting circuit 56.

II. READER OPERATION

Operation of the reader 10 is begun with a start signal input to the initiation logic circuit 70. As the first card 11 passes into the slot 14 of the read station 12, the leading edge 13 of the card effects an "all dark" output from the gating circuit 22, which is then fed to the initiation logic circuit 70. The initiation logic circuit 70 then sets the column and card counting circuits 56 and 64 with a differentiated "reader enable" input thereto.

Referring to the phase-locked loop circuit 44, rotation of the shaft 32 causes movement of the card 11 through the read station 12, and also causes rotation of the timing disc 36. Movement of the ferrous notches 38 past the transducer 40 generates the $F_{ref}$ signal input to the phase-locked loop circuit 44. After a short period of time, the phase-locked loop circuit 44 becomes stabilized, in that the output of the VCO 52 is a pulse train having a number (N) of pulses for each cycle of the $F_{ref}$ signal. The number (N) is dependent upon the design of the VCO 52, and is selected as a binary number; while any binary may be utilized, the number 256 is suitable. With frequency changes in the $F_{ref}$ signal, the phase comparator circuit 46 detects either a phase lead or lag with respect to the output of the binary divider 54, which lead or lag signal is then fed into the VCO 52 via the low pass filter 48 and the amplifier 50. In a well known manner, the VCO 52 adjusts the overall period of the pulse train transmitted therefrom, such that the period of the pulse train increases with decreases in the velocity of the card through the read station, or alternatively decreases with increases in the velocity of the card. Thus, the (N) $F_{ref}$ signal output from the phase-locked loop circuit includes a given number of pulses in a pulse train, the entire pulse train being expanded or contracted with respect to time responsive to changes in the velocity of the shaft 32. The number of ferrous notches 38 is preselected to have a specific ratio with respect to the number of data columns on the card 11, for example one notch per column. The pulse train output from the phase-locked loop circuit 44 will therefore have (N) pulses per column.

The (N) $F_{ref}$ signal is then fed into the binary divider circuit 58 of the column counting circuit 56. This divider circuit, assuming the presence of the "reader enable" input, divides the (N) $F_{ref}$ signal into the constituent binary numbers, for example in the instance of the binary 256 pulses in the pulse train, the binary divider provides 8 binary outputs from $2^0$ to $2^7$. These outputs are decoded in the decoder circuit 60, to provide four outputs $T_O$, $T_{N-A}$, $T_{N-B}$ and $T_N$. $T_N$ represents the last pulse in the pulse train, $T_O$ represents a predetermined pulse located preferably at the end of the first one-third of the pulse train, and $T_{N-A}$ represents a pulse occurring at about the beginning of the second third of the pulse train. $T_{N-B}$ is a pulse occurring intermediate between the pulse representing signal $T_{N-A}$ and the pulse representing signal $T_N$ (note FIGS. 3(g), (i) and (h), respectively).

Figure 2:
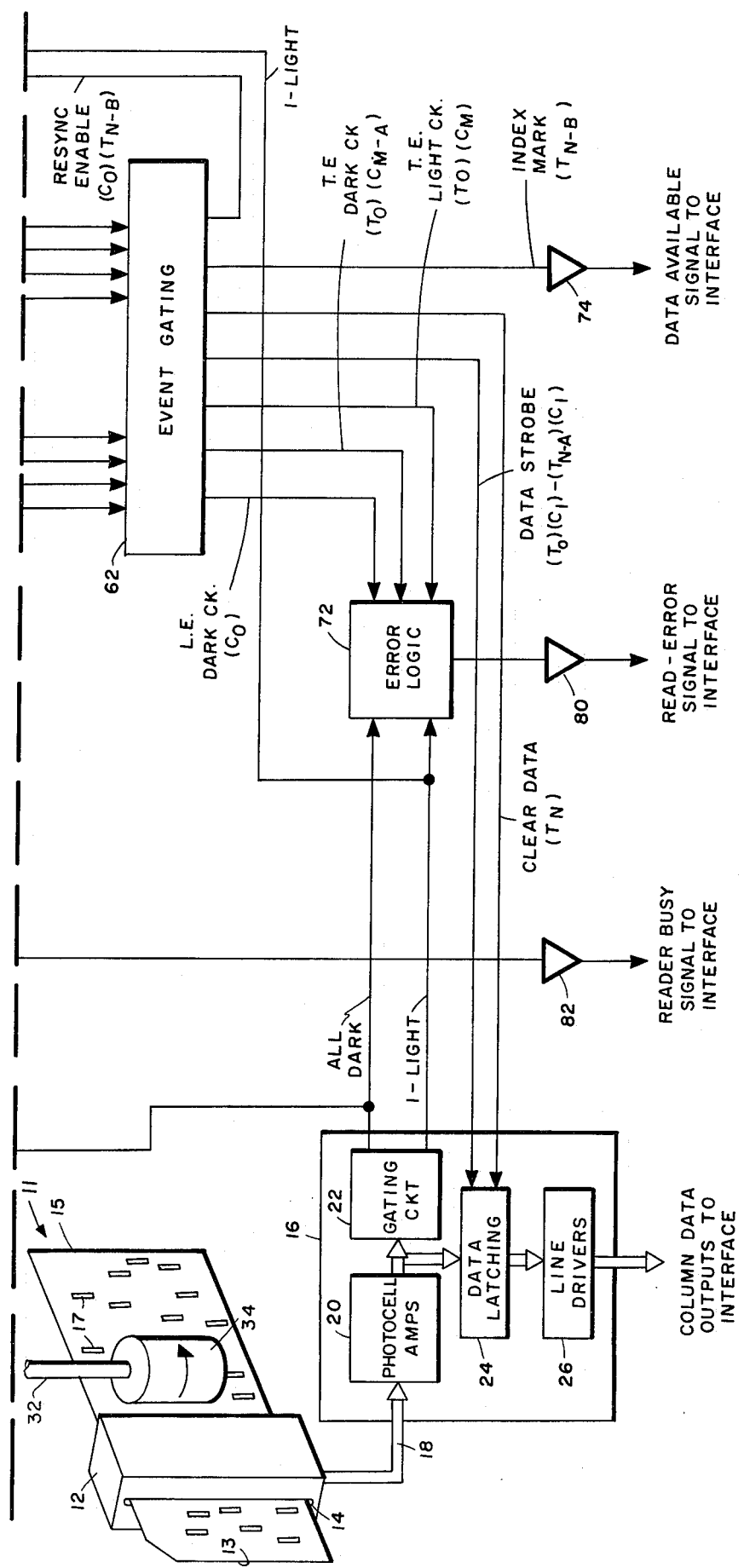
Figure 3:
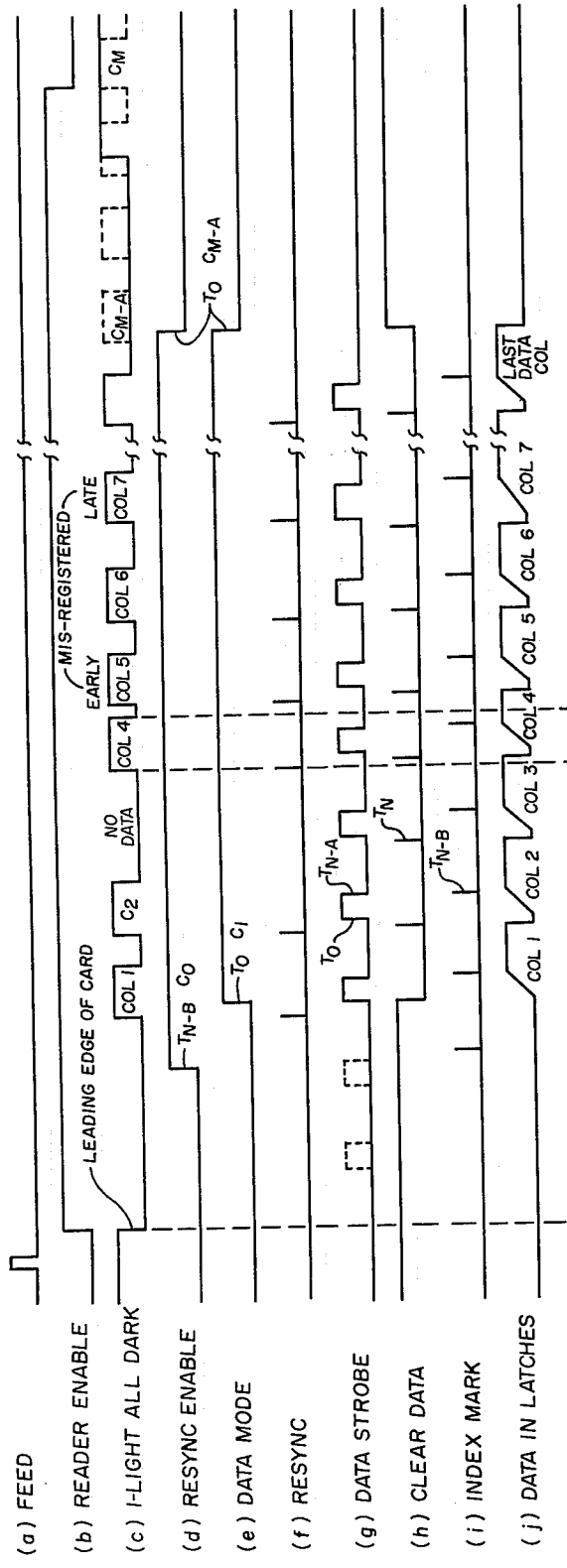
Figure 4:
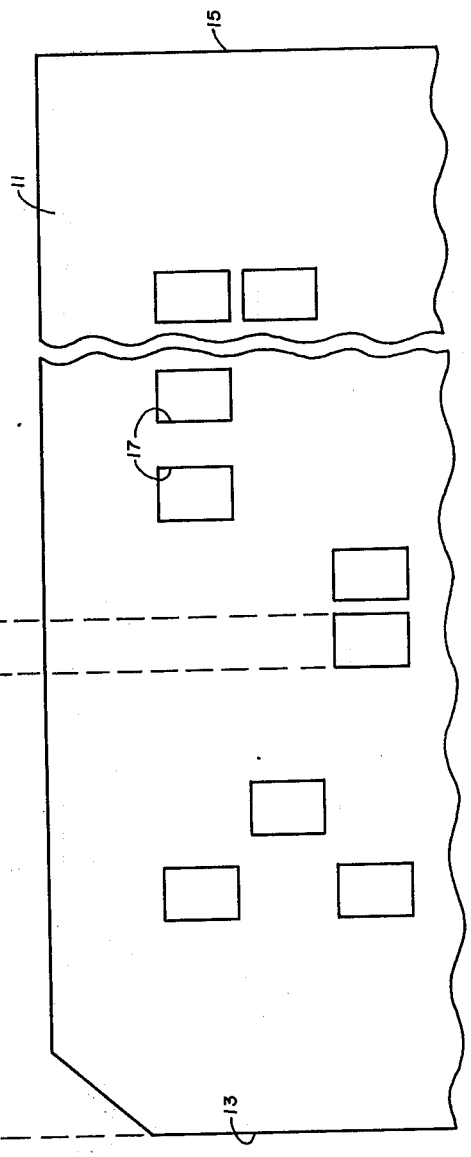

As shown in FIG. 1, signal output $T_N$ from the decoder circuit 60 is also fed into the binary divider circuit 66 of the card counting circuit 64. In a manner similar to that described above with respect to the column counting circuit 56, the card counting circuit 64 provides five outputs, each of which occurs at a specific $T_N$ signal, and is predetermined by the decoder circuit 68. Four of the five outputs from the decoder circuit 68 are fed into the event gating circuit 62, and comprise outputs $C_O$, $C_I$, $C_{M-A}$ and $C_M$. A fifth output $C_{M+X}$ is fed to the initiation logic circuit 70.

The outputs of the event gating circuit 62, the gating circuit 22 and the resynchronization circuit including the "and" gate 76 and the differential amplifier 78 will be described with reference to FIGS. 3(a)-(j).

As previously described, operation of the reader 10 is begun with a start signal to the initiation logic circuit 70. As the leading edge 13 of the data card 11 (note FIG. 4) the "one-light" signal generated by the absence of the card is terminated, and an "all dark" output is fed to the initiation logic circuit 70, causing the "reader enable" signal (note FIG. 3(b)) to set the column and card counting circuits 56 and 64. After the leading edge dark area has passed the photocells in the read station 12, the event gating circuit 62 outputs a "leading edge dark check" to the error logic circuit 72. This leading edge dark check signal comprises the $C_O$ output of the card counting circuit 64, and if the error logic circuit 72 has not seen a "all dark" signal prior to receipt of the $C_O$ leading edge dark check signal, then a read error signal is generated to the interface through the line driver 80.

When the card 11 advances through the read station 12 such that the first column of punched holes 17 is adjacent the photocells, a "one-light" signal is initiated. Previous to this "one-light" condition, the coincidence of $C_O$ and $T_{N-B}$ outputs from the respective counting circuits 64 and 56 provides a "resynch enable" signal to the "and" gate 76 (note FIG. 3(d)). When the "one-light" condition is detected, this signal is also fed to the resynchronization "and" gate 76, which in turn restarts the binary divider circuit 58 of the column counting circuit 56. In this way, the pulse train is referenced from the leading edge of any one punched hole 17 in the first data column having a punched hole therein. Subsequently, output $T_O$ from the column counting circuit 56 occurs coincident with a predetermined pulse in the pulse train output of the phase-locked loop circuit 44. Noting the "data strobe" output from the event gating circuit 62, the occurrence of outputs $T_O$ and $C_I$ from the respective counters 56 and 64 releases the stored data outputs of the photocell amplifier 20 stored in the data latching circuit 24. These data outputs are then transmitted through the line drivers 26 to the interface. The "data strobe" signal is terminated upon the occurrence of the $T_{N-A}$ from the column counting circuit 56, and the continuation of the $C_I$ output from the card counting circuit 64. These data strobe signals continue for each column in which data appears therein, as is shown in FIG. 3(g). It will be noted that the width of the data strobe is approximately one-third of the overall column between the leading and trailing edges thereof, appearing in the middle one-third.

At the end of a given pulse train, the $T_N$ output from the column counting circuit 56 is fed to the data latching circuit 24 of the output section 16, in order to clear data therefrom and reset the data latching circuit to receive further output from the photocell amplifiers 20. Prior to initiation of the $T_N$ signal, $T_{N-B}$ is fed to the interface through the line driver 74 to provide an "index mark" indicating that data is available from the data latching circuit 24 (note FIG. 3(i)). The outputs from the data latching circuit 24 are subsequently fed into the interface, as is shown by each column of information noted at FIG. (j).

Noting columns 5 and 7 of FIG. 3(c), there is shown at column 5 a misregistered data column which appears early with respect to the normal position. Column 7 depicts a punched hole appearing late with respect to the normal position. It will be seen that the resynchronization signal (FIG. 3(f)) is generated responsive to the "one-light" condition determined at the leading edge of the hole, and thereafter resets the column counting circuit 56 so that $T_O$, and subsequent outputs $T_{N-A}$, $T_{N-B}$ and $T_N$, are all reset with respect to the changed condition of the misregistered column of data. The above synchronization and resynchronization means allows the use of much less expensive drive motors than the hysterisis-type synchronous motors described above. Further, the use of the phase-locked loop circuit provides a means for tracking changes in the drive shaft velocity, and generating an output responsive thereto. Further, the resynchronization technique described above allows the counting circuits to be reset for each data column in which a punched hole, or equivalent information is contained in the data card.

I claim:

1. Apparatus for reading data cards of the type having columns of machine-readable information thereon, and for providing data outputs representative of said information to a device interfaced therewith, said apparatus including means for synchronizing said data outputs with the respective column of said cards, said synchronizing means comprising:

means including a rotatable shaft for driving said cards through said apparatus;

means for detecting the position of said shaft for each said column;

means for receiving an output from said detecting means and generating a train of pulses, the period of said pulse train being dependent upon the angular velocity of said shaft;

means for processing said pulse train for correlation of each said data output with the corresponding one of said columns, said processing means including first counting means for counting pulses in said pulse train and generating a first output at a predetermined pulse;

means for detecting a leading edge of each said column; and means for restarting said first counting means responsive to an output from said column leading edge detecting means.

2. Apparatus as recited in claim 1, wherein said card driving means comprises a motor including said shaft for mechanically driving said cards through said apparatus.

3. Apparatus as recited in claim 2 wherein said detecting means comprises:
a disc mounted on said shaft and rotatable therewith, said disc having a plurality of notches thereon, at least one of said notches representing each of said columns; and
means fixed adjacent said disc for detecting each said notch during rotation of said shaft.

4. The apparatus as recited in claim 1 wherein said pulse train generating means comprises a phase-locked loop circuit coupled to said detecting means.

5. The apparatus recited in claim 4 wherein said phase-locked loop circuit comprises:
a voltage controlled oscillator;
a binary divider coupled to an output of said voltage controlled oscillator;
a comparator circuit for receiving and comparing outputs from both said binary divider and said detecting means and providing an output representative of the phase difference therebetween;
means for coupling said phase difference output from said comparator circuit to an input of said voltage controlled oscillator; and wherein
said pulse train comprises said output from said voltage controlled oscillator.

6. The apparatus recited in claim 1 wherein the number of pulses in said pulse train comprises a binary number.

7. The apparatus recited in claim 1 further comprising means for detecting entry of the leading edge of one of said data cards entering said apparatus and providing an enabling signal representative thereof.

8. The apparatus recited in claim 7 wherein said first counting means further comprises means for receiving said enabling signal and generating said first output coincident with said predetermined pulse and subsequent to receipt of said enabling signal.

9. The apparatus recited in claim 8 wherein said apparatus includes a data latching means for receiving said first output and reading the corresponding column coincident therewith.

10. The apparatus recited in claim 9 wherein said predetermined pulse is selected to coincide with the presence of a middle portion of the corresponding column.

11. The apparatus recited in claim 9 wherein said first counting means further comprises means for terminating said first output to said data latching means coincident with a second predetermined pulse subsequent to said first predetermined pulse.

12. The apparatus recited in claim 11 wherein said first counting means further comprises means for generating an index output to said interface subsequent to termination of said first output.

13. The apparatus recited in claim 9 wherein said first counting means further comprises means for generating another output coincident with the last pulse in said pulse train.

14. The apparatus recited in claim 13 further comprising means for routing said another output to said data latching means for clearing said data outputs therein.

15. The apparatus recited in claim 13 further comprising second counting means coupled to said another output of said first counting means and to said leading edge detecting means, said second counting means further comprising means for generating a zero column output at a given one of said first outputs from said counting means and prior to a first data column passing through said apparatus.

16. The apparatus recited in claim 15 further comprising:
means for detecting the absence of data columns in a card passing through said apparatus; and
error detecting means for comparing an output from said column absence detecting means and said zero column output from said second counting means and providing an error output to said interface when a data column is detected prior to said zero column output.

17. The apparatus recited in claim 16 wherein said counting means further comprises means for counting said other outputs from said first counting means generating an end-of-data output corresponding to a trailing portion of said card having no data columns therein.

18. The apparatus recited in claim 17 further comprising:
means for routing said end-of-data output to said error detecting means;
said error detecting means further includes means for comparing an output from said column-absence detecting means with said end-of-data output and providing an error output to said interface when a data column is detected subsequent to said end-of-data output.

19. A card reader for reading data cards of the type having columns of machine-readable information thereon and transmitting data outputs representative of said information to an interface device coupled thereto, said card reader comprising:
a read station having means for sensing said information in each column and generating corresponding data outputs;
latching means for receiving said data outputs from said sensing means and transmitting said data outputs to said interface device responsive to a strobing signal;
means for transporting said cars through said read station;
means for detecting the velocity of said cards during transport through said read station;
means for generating a pulse train for each column responsive to an output from said velocity detecting means and thereafter increasing the period of said pulse train for decreases in the velocity of said card or decreasing the period of said pulse train for increases in the velocity of said cards;
means for counting pulses in said train and generating said strobing signal to said latching means coincident with a first predetermined pulse in said train;
means for detecting a card in said read station and providing an enabling signal representative thereof to said counting means;
means for initiating operation of said counting means upon receipt of said enabling signal;
means for detecting the leading edge of each column and providing a leading edge output representative thereof; and
means for re-initiating operation of said counting means upon receipt of said leading edge output.

20. The apparatus recited in claim 19 wherein said counting means further comprises means for terminating said strobing signal coincident with a second predetermined pulse subsequent to said first predetermined pulse.

21. The apparatus recited in claim 19 wherein said pulse train generating means comprises a phase-locked loop circuit coupled between said velocity detecting means and said counting means.

22. A method for reading data cards of the type having columns of machine-readable information thereon, and for providing data outputs representative of said information to a device interfaced therewith, said method including the synchronization of said data outputs with the respective column of said cards, said method comprising the steps of:

transporting said cards through apparatus;
  detecting the velocity of said cards during transport through said apparatus;
  generating a pulse train for each column of information and thereafter increasing the period of said pulse train for decreases in the velocity of said card or decreasing the period of said pulse trail for increases in the velocity of said card;
  counting said pulses and generating a strobing signal coincident with a predetermined pulse in said pulse train to correlate each said output with the corresponding one of said columns,
  detecting the leading edge of each said column and providing an output representative thereof; and
  resynchronizing said counting sequence responsive to said column leading edge output.

23. A card reader for reading data cards of the type having columns of machine-readable information thereon and transmitting data outputs representative of said information to an interface device coupled thereto, said card reader comprising:

a read station having means for sensing said information in each column and generating corresponding data outputs;
  means for receiving said data outputs from said sensing means and transmitting said data outputs to said interface device responsive to a strobing signal;
  means for transporting said cards through said read station;
  means for generating a train of electrical pulses for each column of each said card being transported through said read station;
  means for counting said pulses in said pulse train and initiating said strobing signal responsive to a predetermined one of said pulses;
  means for detecting the leading edge of each data column along said card and providing a resynchronization signal responsive thereto; and
  means for resetting said counting means responsive to said resynchronization signal, whereby said strobing signal for all data columns in said card is initiated at a point which is the same distance from the corresponding leading edge of each said data column.

* * * * *